Jan. 20, 1959  J. A. GNANDT ET AL  2,869,681
LUBRICATION MARKERS
Filed Sept. 26, 1955
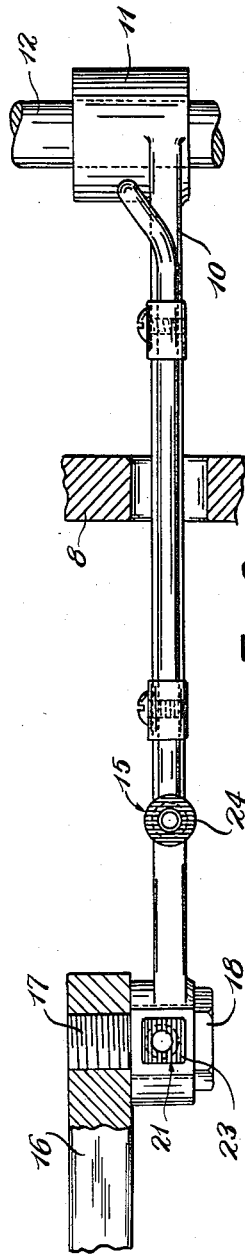
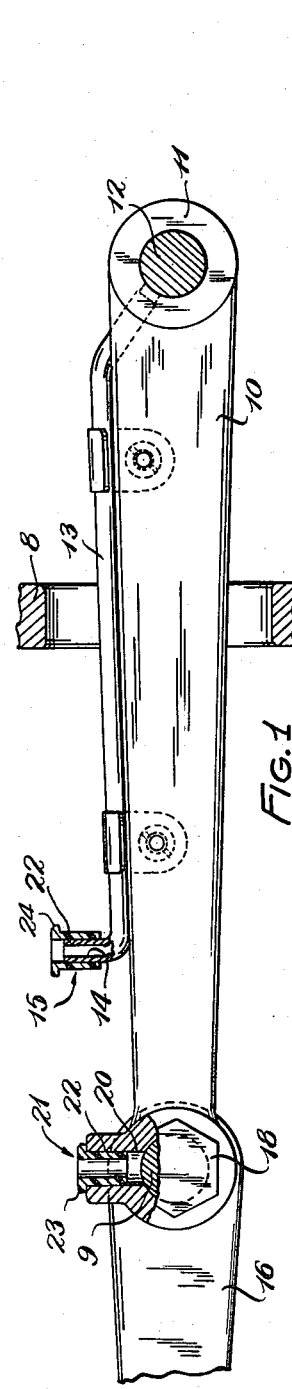
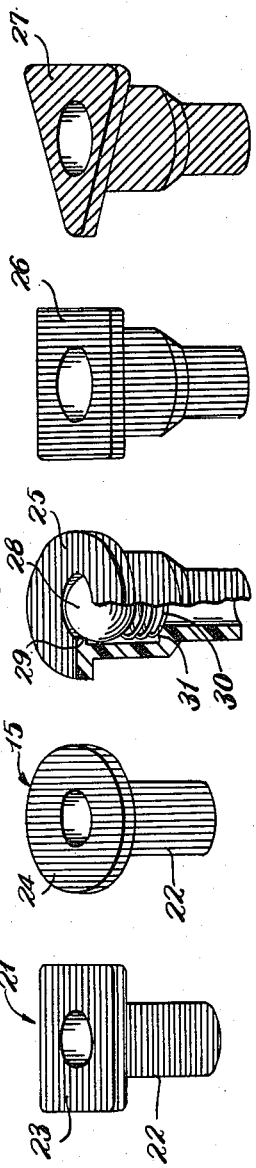
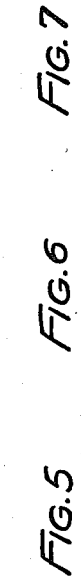
INVENTORS
JOHN A. GNANDT
EDWARD A. KAY
BY
ATTORNEYS United States Patent Office 2,869,681
Patented Jan. 20, 1959

2,869,681

LUBRICATION MARKERS

John A. Gnandt, Cleveland, and Edward A. Kay, Garfield Heights, Ohio, assignors to Harris-Intertype Corporation, Cleveland, Ohio, a corporation of Delaware Application September 26, 1955, Serial No. 536,378

2 Claims. (Cl. 184—105)

This invention relates to improvements in lubrication markers, in which the markers have visible portions of different colors and of different shapes, one to indicate the character or type of the lubricant which it is desirable to use for the different points to be lubricated and the other to indicate the desirable frequency of lubrication at the various points, as for example at every shift or at every day, week or month. Numerous schemes have been devised to facilitate lubrication of machinery with the proper type of lubricant at the proper time. In most of these, some kind of code, such as a color code or shape code is used. For example, a spot of red, green, yellow or other paint may be applied around or next to oil holes. The red color may indicate one grade of oil is to be used, the green a certain other grade, etc. In addition to paint, pressure-sensitive colored tape has also been used. The tape may be cut into circular, square, round, or some other shape to indicate that the lubricant for that point should be applied every day, every week, etc. These two systems have the disadvantage that the tip of an oil can may chip away the paint and tape during use. Furthermore, oils have a tendency to work under paint or tape and loosen them, permitting them to wear or fall off. This requires that the surfaces be absolutely clean when the paint or tape is applied. Sometimes, when it is found that the type of lubricant or frequency of lubrication is to be changed for a given lubrication point, it is difficult to do so because the area must again be thoroughly cleaned in order to apply the new paint or tape.

Another system which has been tried makes use of plastic colored and shaped washers which fit under grease fittings or are fastened to the machine in some manner alongside the point to be serviced. This system overcomes the disadvantages of the previously mentioned systems, but has certain other disadvantages which somewhat limits its use. The washers cannot be mounted in position without some other member holding them in place. Also, when used under a grease fitting, a washer must be larger than the fitting itself in order that it be clearly visible. The larger the washers must be made, of course, the more difficult it is to mount them in small places. Further, with grease fittings being required to hold them in place, machinery design may be affected in that space must be provided for clearance of the fittings, by moving parts, handles, etc. These and numerous other disadvantages are overcome by the present invention.

As in the prior art systems, this invention contemplates the use of codes wherein several different colors and several different shapes, such as round, square or triangular, are employed to indicate the type of lubricant to be used and the desired frequency of lubrication. In its preferred form, the codes are embodied in lubricant fittings attachable to lubricant conductors wherein the color of each fitting indicates the type of lubricant and the shape of a portion of the fitting indicates the frequency of lubrication. The requirements for the different lubrication points of a machine are determined by an engineer and then the fittings for the different lubrication points are selected in accordance with the code.

In view of the fact that experience may call for changes in the selected fittings either as to grade of lubricant or frequency of lubrication, we prefer to form all fittings with cylindrical bodies of predetermined internal and external diameter and to make the lubricant connections of the machine as holes of a diameter to take the external diameter of a fitting or as tubular projections of a diameter to receive the internal diameter of a fitting.

Also we prefer to make the fittings of a plastic material capable of being dyed to permeate the whole of the fitting without the color wearing off. Nylon is one example of a material which lends itself to this end. In addition, nylon may be molded to shape readily in one operation at relatively low cost, is resistant to oil, grease or cleaning solvents, and its strength and elasticity facilitates snug fitting to lubricant conductors.

In accordance with the above one of the objects of the invention is the provision of lubricant fittings having selected colors and shapes coded to designate the character or grade of lubricant and the frequency of application of lubricant desired for each of the different lubrication points of a machine.

Another object is the provision of lubrication cups or other fittings so constructed as to fit snugly into or around the lubricant conductors of a machine.

Still another object of the invention is to embody a lubrication coding system into a group of fittings each of which firmly grips its respective lubricant conductor.

Other objects and features of novelty will appear as we proceed with the description of those embodiments of the invention which, for the purposes of the present application, we have illustrated in the accompanying drawing, in which—

Fig. 1 is a side elevation of a machine part equipped with fittings constructed and applied in accordance with the invention.

Fig. 2 is a plan view of the same.

Figs. 3 and 4 are perspective views on a larger scale of fittings used in the machine part illustrated in Figs. 1 and 2, Fig. 3 being lined for blue and Fig. 4 being lined for red as code indications for certain grades of lubricant, and Fig. 3 having a square head and Fig. 4 a round head as code indications for predetermined frequencies of lubrication.

Fig. 5 is a perspective view, partially in section, of a lubrication cup lined for blue to indicate the same grade of lubricant as in Fig. 3 and having a circular head to indicate the same frequency of lubrication as in Fig. 4.

Fig. 6 is a perspective view of a lubrication cup lined for red to indicate the same grade of lubricant as in Fig. 4 and having a square head to indicate the same frequency of lubrication as in Fig. 3, and Fig. 7 is a perspective view of a lubrication cup lined for green to indicate a different lubricant than that indicated for any of the previous figures and having a triangular shaped head to indicate a frequency of lubrication different from that of any of the preceding figures.

In Figs. 1 and 2, 10 may indicate a connecting rod intended to have movement back and forth from the position illustrated and comprising a hub 11 which is oscillatable about a bodily movable short shaft 12. In order to provide lubrication for the bearing between the hub 11 and shaft 12, especially where the bearing is covered by a housing such as 8, or is in some other position that is not readily accessible, a tubular oil conductor 13 is attached to the connecting rod. Its right end, as viewed in the drawing, projects through an opening in hub 11 extending to the shaft 12, and its left end is upturned at 14. Over this upturned end an oil fitting 15 made in accordance with the invention is tightly pressed.

The part 16 may represent a short crank for reciprocating the connecting rod 10. It is drilled and threaded at 17 to receive the threaded end of a bolt or stub shaft 18, the intermediate shank portion 9 of which forms a smooth bearing for the left end of the connecting rod 10. The latter is drilled at 20 to provide an oil conductor leading to the bearing between the connecting rod and the stub shaft 18. The drilled hole 20 is so dimensioned as to receive with a snug fit the outer diameter of a fitting 21 which, insofar as its cylindrical body portion 22 is concerned, may be identical in shape and size with the cylindrical body portion of fitting 15. Such fitting may be pressed into the hole 20, or it may be forced over and caused to grip the upright portion 14 of tubular conductor 13. It is to be understood that while press fits are preferred, the conductors and fittings may be provided with screw threads if desired and the fittings attached accordingly.

The fitting 21 may, for example, be blue in color as indicated by the lining in Fig. 3, while the fitting 15 may be red as indicated in Fig. 4. Also the fitting 21 may have an integral square head 23 while the fitting 15 has a round head 24. The square head of fitting 21 may indicate a certain desirable frequency of lubrication through that fitting, as for example once during each working shift, while the fitting 15 being mounted on an end of rather long tubular conductor 13 which has considerable capacity may indicate by its round head that lubrication is necessary at comparatively infrequent intervals, as for example once a week. In some cases it may be preferred to reverse the code indications, that is to employ the shape of the head to designate the desired grade of lubricant while the color designates the proper frequency of lubrications.

In Figs. 5, 6 and 7, the fittings take the form of grease or oil cups. The illustrations in these figures indicate that the cups are colored blue, red and green respectively which according to a code call for lubricants of different characters. The body portions of the cups should preferably be identical in shape and size to fit into or around lubricant conductors in a manner similar to that of the fittings 15 and 21 previously described. The cups may have integral or otherwise permanently attached heads 25, 26 and 27 of round, square and triangular shape respectively, for indicating different frequency periods. Like the fittings 15 and 21 they are preferably made of molded nylon or any other material resistant to any deleterious effects from oil, grease, detergents, or chemicals of various kinds and possessing sufficient solidity and resilience to fit snugly and interchangeably within or around lubricant conductors.

Any of the fittings 15, 21, 25, 26 and 27 may be furnished with ball valves to exclude dirt. Such a ball valve is shown at 28 in Fig. 5 where it is held against an inwardly extending lip 29 by a spring 30, the latter bearing against a shoulder 31 at the base of the cup. The resiliency of the nylon material is sufficient to permit the ball to be sprung past the lip 29 during assembly. While the spring holds the ball valve normally closed, it is readily compressed by the nozzle of an oil can to admit oil, as will be readily understood.

Having thus described our invention, we claim:

1. A nylon lubrication marker comprising a tubular cylindrical body portion constructed to grip externally a tubular lubricant conductor of a given diameter or to grip internally a lubricant conductor of a greater diameter, said marker having an integral viewable head portion comprising a flange of selected geometrical form and of selected color, the shape and color of said flange being chosen in accordance with predetermined codes to indicate both the character of lubricant and the frequency of lubrication best suited to the part to which the marker is attached.

2. A marker as defined in claim 1 wherein the cylindrical body portion of the marker has solidity and elasticity sufficient to tightly grip by friction the lubricant conductor to which it is attached.

References Cited in the file of this patent
UNITED STATES PATENTS

| | | |
|---|---|---|
| 1,628,220 | Berg | May 10, 1927 |
| 2,254,502 | Thomas et al. | Sept. 2, 1941 |
| 2,546,672 | Le Clair | Mar. 27, 1951 |
| 2,680,497 | Miller | June 8, 1954 |

OTHER REFERENCES

Textile World, December 1944, pages 99 and 101.